United States Patent [19]

Imao et al.

[11] Patent Number: 5,214,103
[45] Date of Patent: May 25, 1993

[54] ETHYLENE-PROPYLENE TYPE RUBBER COMPOSITION

[75] Inventors: Akira Imao, Kakamigahara; Masayoshi Ichikawa, Ichinomiya, both of Japan

[73] Assignee: Toyoda Gosei Co., Ltd., Nishikasugai, Japan

[21] Appl. No.: 693,230

[22] Filed: Apr. 29, 1991

[30] Foreign Application Priority Data

Apr. 30, 1990 [JP] Japan ................................. 2-114370

[51] Int. Cl.$^5$ ................................................ C08F 8/00
[52] U.S. Cl. ................................. 525/193; 525/211; 525/237; 525/293
[58] Field of Search ................. 525/193, 237, 293, 211

[56] References Cited

U.S. PATENT DOCUMENTS

| | | | |
|---|---|---|---|
| 3,806,558 | 4/1974 | Fischer | 525/193 |
| 4,031,169 | 6/1977 | Morris | 525/193 |
| 4,734,305 | 3/1986 | Sugimoto et al. | |
| 4,877,827 | 11/1989 | Van Der Groep | 525/211 |
| 4,997,880 | 5/1991 | Van Der Groep | 525/211 |

*Primary Examiner*—Bernard Lipman
*Attorney, Agent, or Firm*—Cushman, Darby & Cushman

[57] ABSTRACT

The disclosure describes a peroxide curing rubber composition with good heat characteristics and which has physical properties such as oil resistance and tensile strength similar to conventional sulfur cured rubber compositions. The rubber composition is useful for high heat applications such as a radiator hose.

8 Claims, No Drawings

ETHYLENE-PROPYLENE TYPE RUBBER COMPOSITION

BACKGROUND OF THE INVENTION

1. Field of the Invention

This invention relates to a peroxide curing ethylene-propylene rubber composition.

In the present invention, since an ethylene-propylene non-conjugate diene tertpolymer is used as the ethylene-propylene rubber, the ethylene-propylene rubber will be referred to hereinafter as "EPDM".

Particularly, this invention elates to an EPDM composition which is capable of obtaining not only the heat resistance particularly required for automobile radiator hoses and other rubber products, but also equivalent physical properties in original state and oil resistance to those of the rubber products formed of a sulfur curing EPDM.

In the following description, the compositions will be expressed by proportions of components in weight.

The abbreviations to be used hereinbelow will be defined as follows.

EPDM —Ethylene-propylene non-conjugated diene terpolymer: A composite obtained by combining ethylene and propylene as main components with a minor amount of a non-conjugated dienes thereby incorporating a double bond in the side chain of the molecule and consequently rendering the composite curable with sulfur. The non-conjugated dienes which are usable herein include ethylidene norbornene and cyclopentadiene, for example.

$ML_{1+4}$ (100° C. ) —Unit of Mooney viscosity: The scale reading of the tester using a large disc (L) obtained after one minute's preheating of the disc plus four minutes rotation of the disc.

2. Description of the Prior Art

The EPDM composition excels in weatherability, heat resistance, hot water resistance, steam resistance, etc. and, consequently, it is extensively used for radiator hoses. Conventional sulfur cured EPDM compositions have superior physical properties in original state (such as tensile strength, etc.) and oil resistance, over conventional peroxide cured EPDM compositions.

Meanwhile, the conventional peroxide cured EPDM composition generally Excel over the sulfur cured EPDM compositions in terms of heat resistance, hot water resistance, etc.

The radiator hose has recently come to demand heat resistance, hot water resistance, etc. more than ever before. Therefore, an attempt has been made to use the conventional peroxide cured EPDM compositions as a material for the hose.

Unfortunately, the conventional peroxide cured EPDM compositions do no give equivalent physical properties in original state and oil resistance to conventional sulfur cured EPDM composition.

SUMMARY OF THE INVENTION

The objective of the invention is to make a peroxide cured rubber composition with high heat stability and which has physical characteristics such as oil resistance and tensile strength similar to conventional sulfur cured rubber compositions.

To obtain this objective, a low Mooney viscosity and a high Mooney viscosity ethylene-propylene non-conjugate terpolymer are blended together with a peroxide curing agent and an allyl type co-curing agent.

The present inventors have found that the peroxide curing agent tends to be absorbed by the softening agent compounded in the EPDM (required to be compounded in a large amount for getting good moldability particularly in the extrusion of hoses), thus failing to get a sufficient cross-link density. As a result, the applicants have achieved this invention.

DETAILED DESCRIPTION OF THE INVENTION (1) The EPDM composition of this invention shall have a precondition that the EPDM composition is peroxide curing.

(2) The first characteristic of this invention is that the rubber component should be obtained by blending EPDM components of low and high Mooney viscosities, $ML_{1+4}$(100° C. ), from 20 to 100 and over 200 with compounding ratio of from 90/10 to 60/40, preferably 80/20 to 70/30, low Mooney viscosity/high Mooney viscosity.

If the proportion of the low Mooney EPDM is unduly large, the cured rubber will not obtain such physical properties in original state as tensile strength and elongation at break at desired levels. If the proportion of the high Mooney EPDM is unduly large, kneading and molding efficiency tend to have problems.

(3) The second characteristic of this invention is that the peroxide curing agent should be compounded with 2 to 8 parts against 100 parts by weight of the rubber component.

If the proportion of the peroxide curing agent is less than 2 parts, the cured rubber tends to be adversely affected in oil resistance and tensile strength. If it exceeds 8 parts, the cured rubber will not acquire sufficient elongation at break.

As the peroxide curing agent, 1,3-bis(tertiary butyl peroxyisopropyl)benzene, n-butyl-4,4-bis(tertiary butyl peroxy)-valerate, 1,1-bis(tertiary butylperoxy)-3,3,5-trimethyl cyclohexane, and 1,1-bis(tertiary butylperoxy)cyclododecane may be used.

(4) The third characteristic of this invention is that the allyl type cocuring agent is compounded with 0.5 to 5 parts against 100 parts by weight of the rubber component.

The compounding of the allyl type cocuring agent results in heightening the cross-link density and improving the oil resistance.

If the proportion of the allyl type cocuring agent is less than 0.5 part, sufficient oil resistance is not obtained for the cured rubber. If this proportion exceeds 5 parts, it brings about an adverse effect of heightening the cross-link density excessively and decreasing the elongation at break.

The allyl type cocuring agents which are effectively usable herein include diallyl fumarate, diallyl phthalate, tetraallyloxy ethane, triallyl isocyanurate, and triallyl cyanurate, for example. Among them, triallyl isoyyanurate is desirable.

(5) In addition to the aforementioned ingredients, the rubber component may have such additives as carbon blacks, talc, process oils, and antioxidants, etc.

The desirable amount of the process oil to be compounded is less than 50 parts. If the proportion of the process oil exceeds 50 parts, the peroxide curing agent does not work effectively.

Examples of process oils include paraffin type, naphthene type, and aromatic hydrocarbon type oils. Among them, paraffin type oils are preferable.

EXAMPLES

Now, the present invention will be described more specifically below based on the test results for embodiments and comparative examples, demonstrating the advantages of the EPDM compositions.

EPDM compositions (molding materials) for the embodiments, and comparative examples were prepared using the formulas indicated in Table 1. Each of these molding materials was molded in compression molding (molding pressure 100 kgf/cm$^2$[9.8 MPa]) under the curing conditions of 160° C.×10 minutes, thus producing test pieces of 2 mm thickness.

The test pieces thus obtained were tested for the physical properties specified below. The results are shown in Table 1. It is clearly noted that the cured rubbers according to the embodiments exhibit finely balanced physical properties in original state and good oil resistance. In contrast, the rubber using solely a low Mooney EPDM and talc (Comparative Example 1) was deficient in elongation at break, and the rubber with no talc (Comparative Example 2 and 3) was deficient in oil resistance.

(1) Hardness (JIS A) ... conforms to JIS K 6301.
(2) Tensile strength ... conforms to JIS K 6301.
(3) Elongation at break ... conforms to JIS K 6301.
(4) Oil resistance ... conforms to JIS K 6301 (Oil used for test: Oil No. 1, conditions: 100° C. ×70 hours).

TABLE 1

| | Example | | | Comparative Experiment | | |
|---|---|---|---|---|---|---|
| | 1 | 2 | 3 | 1 | 2 | 3 |
| Rubber Component | | | | | | |
| EPDM (ML$_{1+4}$65)[1] | 75 | | | 100 | 100 | 100 |
| EPDM (ML$_{1+4}$45)[2] | | 75 | 75 | | | |
| EPDM (ML$_{1+4}$240)[3] | 25 | 25 | 25 | | | |
| Ingredients | | | | | | |
| Carbon black | 50 | 50 | 50 | 50 | 75 | 105 |
| Talc, particle diameter 0.32 μm | 50 | 50 | 50 | 50 | | |
| Paraffin type processed oil | 30 | 30 | 30 | 30 | 30 | 60 |
| Antioxidant | 2.5 | 2.5 | 2.5 | 2.5 | 2.5 | 2.5 |
| Peroxide[4] | 2.8 | 2.8 | | 2.8 | | |
| Peroxide[5] | | | 6 | | 4 | 3.2 |
| Triallyl isocyanaturate | 2 | 2 | 2 | 2 | 0.5 | 0.5 |
| Physical properties | | | | | | |
| Hardness (JIS A) | 70 | 70 | 71 | 70 | 73 | 68 |
| Tensile strength | | | | | | |
| (kg/cm$^2$) | 167 | 206 | 146 | 129 | 124 | 33 |
| (MPa) | 16.4 | 20.2 | 14.3 | 12.6 | 12.1 | 32.4 |
| Elongation (%) | 330 | 330 | 340 | 260 | 450 | 450 |
| Volume change ratio (%) | +65 | +68 | +73 | +66 | +118 | +165 |

[1] JSREP 161 (produced by Japan synthetic Rubber Co., Ltd. C$_3$ content 43%
[2] Espren 505A (produced by Sumitomo Chemical Co., Ltd. C$_3$ content 45%
[3] Espren 600F (produced by Sumitomo Chemical Co., Ltd. C$_3$ content 53%
[4] 1,3-Bis(tertiary-butylperoxyidopropyl)benzene
[5] n-buty-4,4-bis(tertiary-butylperoxy)valerate

What is claimed is:

1. A peroxide curing ethylene-propylene rubber composition comprising:
   a rubber component obtained by blending a first ethylene-propylene non-conjugated terpolymer having a Mooney viscosity, ML$_{1+4}$ (100° C.), of 20 to 100 and a second ethylene-propylene non-conjugated terpolymer having a Mooney viscosity, ML$_{1+4}$ (100° C.) greater than 200, the ratio first/second terpolymer being from 90/10 to 60/40;
   a peroxide curing agent in the amount of 2 to 8 parts per 100 by weight of said rubber component; and
   an allyl type cocuring agent in the amount of 0.5 to 5 parts per 100 parts by weight of said rubber component.

2. An ethylene-propylene rubber composition according to claim 1, wherein the ratio first/second terpolymers is in the range of from 80/20 to 70/30.

3. An ethylene-propylene rubber composition according to claim 1, wherein said peroxide curing agent is selected from the group consisting of 1,3-bis(tertiary butylperoxyisopropyl) benzene, n-butyl-4,4-bis(tertiary butyl peroxy) valerate, 1,1-bis(tertiary butylperoxy)-3,3,5-trimethylcyclohexane, and 1,1-bis(tertiary butylperoxy)-cyclododecane.

4. An ethylene-propylene type rubber composition according to claim 1, wherein said allyl type cocuring agent is selected from the group consisting of diallyl fumarate, diallyl phthalate, tetraallyl oxyethane, triallyl isocyanurate, and triallyl cyanurate.

5. An ethylene-propylene rubber composition according to claim 4, wherein said allyl type cocuring agent is triallyl cyanurate.

6. An ethylene-propylene rubber composition according to claim 1, further comprising a process oil in an amount less than 50 parts per 100 parts by weight of said rubber component.

7. A peroxide curable ethylene-propylene rubber composition comprising:
   a rubber component obtained by blending a first ethylene-propylene non-conjugated terpolymer having a Mooney viscosity, ML$_{1+4}$ (100° C.), in the range of 20 to 100 and an ethylene-propylene non-conjugated terpolymer having a Mooney viscosity, ML$_{1+4}$ (100° C.) of over 200, the ratio first/second terpolymers being from 90/10 to 60/40; and, blended therein a peroxide curing agent and an allyl type co-curing agent.

8. The composition of claim 7, wherein 2 to 8 weight parts period curing agent per 100 parts by weight of said rubber component and 0.5 to 5 weighs parts of an allyl type co-curing agent per 100 parts by weight of said rubber component are blended in.

* * * * *